Jan. 28, 1964  F D. MOSS ETAL  3,119,800
METHOD OF CONTROLLING THE MOLECULAR WEIGHT OF POLYISOPRENE
Filed April 7, 1961
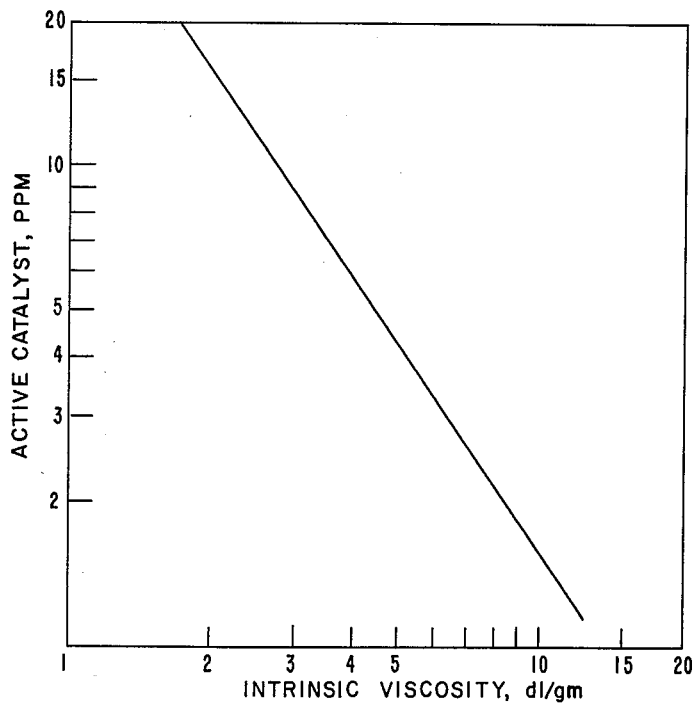
FIG. I
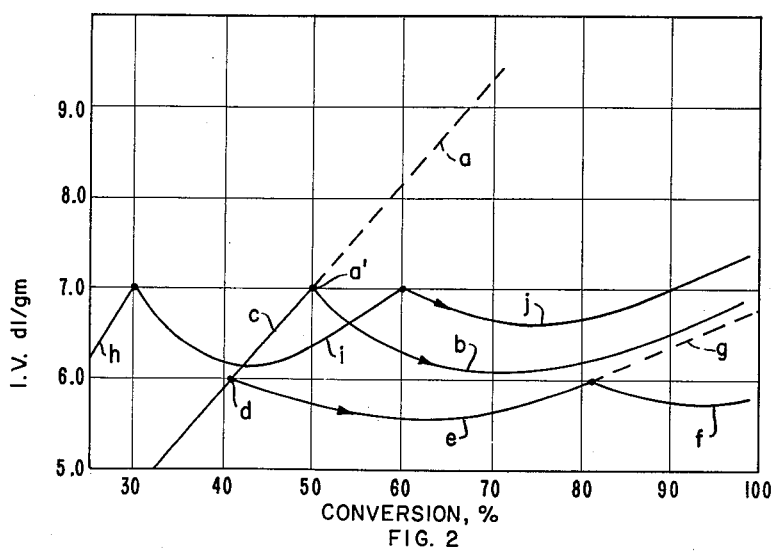
FIG. 2
INVENTORS:
F. DUDLEY MOSS
ARTHUR R. BEAN, JR.
BY: Harold Shain
THEIR ATTORNEY

United States Patent Office 3,119,800
Patented Jan. 28, 1964

3,119,800
METHOD OF CONTROLLING THE MOLECULAR WEIGHT OF POLYISOPRENE
F Dudley Moss, Long Beach, and Arthur R. Bean, Jr., Buena Park, Calif., assignors to Shell Oil Company, New York, N.Y., a corporation of Delaware
Filed Apr. 7, 1961, Ser. No. 101,536
16 Claims. (Cl. 260—94.2)

This invention relates to improvements in the polymerization of conjugated dienes to produce synthetic elastomers predominating in the cis 1,4-addition product. More particularly, it relates to such polymerizations with lithium-based catalysts.

It is now known that conjugated dienes may be polymerized to produce an elastomeric polymer that predominates in the cis 1,4-addition product. The cis 1,4-addition products of, for example, isoprene resemble the structure of natural rubber of the Hevea variety. It is not enough, however, that isoprene be polymerized to produce a solid elastomer since there are numerous other considerations that are controlling if the resulting product is to be useful as a practical matter. These other considerations include, for example, the molecular weight of the product, percentage of the cis 1,4-addition content, the Mooney viscosity, the molecular weight distribution, and other physical and chemical considerations that, in the last analysis, make the polymer worthwhile. Of greatest importance is the cis 1,4-addition content and the molecular weight, which is represented by the intrinsic viscosity (I.V.). Both of these values are important because they exert a controlling effect on the final product. Generally, the higher the cis 1,4-content, the better the product. On the other hand, the I.V. must be controlled within certain values and if the I.V. is too high or too low, the resulting product, as a practical matter, has a more limited utility. The extent to which these properties are controllable depends on the several variables that are involved in the polymerization processes. Two of the more important variables are the nature of the catalyst and the amount that is employed.

The present invention is directed to improvements in the processes for polymerizing conjugated dienes, as for example isoprene and butadiene, with catalysts that are referred to as "lithium-based." "Lithium-based" catalysts are catalysts that contain lithium and/or lithium compounds, which catalysts effect the polymerization of conjugated dienes to produce synthetic elastomers having a predominant portion of the cis 1,4-addition product. Quite often, as in the case of isoprene, the cis 1,4-content is in the order of 90–95%. Among the well-known lithium-based catalysts there may be mentioned lithium metal, lithium hydrocarbyls, organo-lithium amides, various mixtures thereof and the like. Among the prior art which describes the various polymerizations of isoprene using lithium-based catalysts, there may be mentioned U.S. Patents 2,849,432, 2,856,391, and 2,913,444. Among the more preferred catalysts species there may be mentioned alkyl lithium compounds such as n-butyl lithium, sec-butyl lithium, amyl lithium, isobutyl lithium and other alkyl lithium compounds, particularly those having up to 8 carbon atoms. One of the characteristics of lithium-based catalysts is that the production of a high cis 1,4-content is invariably accompanied by a resulting high molecular weight at suitable concentrations of polymer in the reaction product. The high molecular weight, represented by the intrinsic viscosity, produces practical difficulties during the manufacture of vulcanizates. While there have been suggestions for reduction in the I.V. while maintaining the high structural purity, such suggestions have not been particularly fruitful so that in the past the polymerization processes were so regulated to produce an elastomer having a lower I.V. As a result, the product is invariably accompanied by a reduction in the cis 1,4-content. This relationship between the structure and the I.V. is sometimes referred to as "the structure-I.V. pinch." The adverse effect of the pinch may be somewhat reduced by extremely careful control of the polymerization conditions, the purity of the feed streams, the concentration of the monomer in the solvent, and the like. However, such rigid control has obvious disadvantages for commercial operation as well as having inherent limitations. The present invention provides processes whereby the above-mentioned structure-I.V. pinch is eliminated.

It is an object of this invention to provide improved processes for the polymerization of conjugated dienes whereby the interdependency of the cis 1,4-content on the I.V. is removed. More particularly, it is an object of this invention to improve the polymerizations of conjugated dienes with lithium-based catalysts whereby products of higher cis 1,4-addition content are obtained while simultaneously permitting control of the intrinsic viscosity to any desired value. It is a more particular object of this invention to produce cis 1,4-polyisoprene having a high percentage of the cis 1,4-addition product irrespective of the intrinsic viscosity or molecular weight. Other objects will become apparent as the description of the invention proceeds.

These and other objects are accomplished by the process for polymerizing a conjugated diene with a lithium-based catalyst to produce a product that predominates in the cis 1,4-addition product, the polymerization being conducted in the presence of an inert hydrocarbon solvent, by the improvement comprising adding to the reactor a polymerization chain terminator when the diene conversion is between 20 and 80 weight percent, the chain terminator having an active hydrogen atom and the amount added being in stoichiometric excess to the active lithium based catalyst present during the polymerization, thereafter adding an additional amount of catalyst, which amount is about equivalent to the terminator. By this process, the polymerization is terminated by the chain terminator and then polymerization is reinitiated by the subsequent addition of catalyst. The termination and reinitiation is accomplished by the use of equivalent amounts of terminator and catalyst so that synthetic elastomer having as high a cis 1,4-content as the catalyst is capable of producing is obtained while the intrinsic viscosity is controlled by the point of time in the polymerization where the elastomer as the desired I.V.

The invention will be described in greater detail as it relates to specific examples and in relation to FIGS. 1 and 2. For the purposes of describing the invention, it is more convenient to select representative dienes and catalysts and make reference to those. It should be understood, however, that the invention is not limited thereto nor to the specific examples illustrated since the present invention is found to be characteristically applied to the polymerization of conjugated dienes, as a class, with lithium-based catalysts.

Continuing with the description of this invention, reference is made to a typical process for polymerizing isoprene with a typical lithium-based catalyst as butyl lithium. The polymerization catalyst may be charged to a reactor containing the isoprene dissolved in an inert hydrocarbon solvent such as isopentane, amylene or other normally liquid, inert, aliphatic hydrocarbon solvent. The concentration of the isoprene in the solvent is not critical as it is more a matter of economical procedure. Generally, however, the monomer is present in an amount from 5 to 25% by weight with 10–20% being more preferred. The polymerization is conducted at temperatures ranging from about room temperature to about 80° C., with temperatures ranging from about 40 to 65° C. being preferred. The polymerization is further characterized in that it is conducted in closed reactors so as to exclude atmospheric impurities such as oxygen and moisture. Impurities that are normally found in commercial isoprene are also harmful and, accordingly, it is common practice to treat the isoprene to reject or deactivate such impurities, particularly acetylenes. The polymerization may also be conducted in a continuous fashion although such polymerizations are more difficult to control. Nevertheless, continuous operations can be accomplished, and the present invention affords a substantial advantage in that the resulting product obviates one of the disadvantages that existed heretofore in either batch or continuous polymerizations. Further details on the basic processes for the polymerization of isoprene with lithium-based castaylsts may be acquired from prior publications of which the above-mentioned U.S. patents are typical. The quantity of the lithium-based catalyst that is employed varies a good deal depending upon the particular lithium-based catalyst, the purity of the monomer, the reaction temperature and similar considerations. In general, however, concentrations in the order of from 1 to 45 p.p.m. (parts per million) may be employed with amounts in the order of 1.5 to 20 p.p.m. being more usual. With lesser amounts of active catalyst, the resulting elastomer has a higher cis 1,4-content and higher molecular weight. The present invention modifies prior art procedures by the above-described "termination-reinitiation" and thereby provides maximum cis 1,4-content at any desired I.V.

For a better understanding of this invention, two matters of practical importance are to be explained. The first matter is that it is the better practice to maintain the catalyst concentration essentially constant throughout the polymerization. This is important inasmuch as the structure of the elastomer depends upon the active catalyst concentration. Thus the catalyst level should be fixed. This does not mean, however, that an average final structure is excluded since invariably an average is what is actually obtained.

The second matter that is to be explained is that a reasonable assumption is that one mole of lithium-based catalyst is responsible for the formation of one molecule of diene polymer irrespective of its molecular weight. This assumption has factual basis in theory and in practice since it appears that the growing polymer chain attaches to the lithium-based catalyst so that a single molecule of the catalyst provides the impetus for a growing chain. That being the case, it will be seen that at any particular instant, in theory, the polymer would have a relatively narrow range of molecular weight distribution.

With the active catalyst concentration fixed at a level to give a maximum, or very high, cis 1,4-content, the polymerization is terminated with a polymerization terminator when the polymer reaches the desired I.V. which normally is the I.V. desired of the final product. The addition of the terminator destroys the catalyst and terminates the growth of polymer chains. This having been done, the polymerization of the remaining monomer is reinitiated and the reinitiated polymerization is permitted to continue until the polymer attains or approaches the same I.V.

The molecular weight of the desired product depends mainly on certain practical considerations and this in turn is related to the particular elastomer that is involved. For cis 1,4-polyisoprene the intrinsic viscosity should be between 3 and 12 and more, preferably it should be between 6.0 and 10.0. If the I.V. is much higher, certain difficulties arise when the elastomer is processed during the manufacture of, for example, automobile tire stock. At lower I.V.'s certain material handling difficulties may arise during recovery and storage. In the case of cis 1,4-polybutadiene, the I.V. may range from about 1.5 to about 8.0 and yet produce a highly suitably product. In both cases, however, the I.V. may be higher or lower without affecting the operability of this invention. It is a surprising and unexpected finding that any polymerization can be carried out to produce both the high cis 1,4-content and any desired I.V. The cis 1,4-content, as previously indicated, is more or less fixed by the choice of catalyst and other process variables. The I.V. is controlled by adding a terminator of the type previously mentioned when the desired I.V. is reached. As it happens, however, the conversion of the monomer is usually too low for economical operations so that instead of recovering the polymer from the termination reaction, the polymerization is reinitiated by the addition of catalyst in an amount about equivalent to the amount of terminator added. Still another unexpected finding is that a reinitiation will produce essentially the same I.V. polymer at twice the conversion where the termination took place. These features will be better understood by making reference to the drawings.

FIG. 1 is a typical log plot showing the relationship between I.V. and active catalyst. Such a plot may be prepared from two or three points established from two or three polymerizations using different catalyst concentrations and noting the I.V. at the same conversion. FIG. 1 was prepared using butyl lithium as the catalyst, with an isoprene concentration of 15% by weight at a conversion of 50%. Such a plot does not take into account the cis 1,4-content since that is mainly a factor that is controlled by the inherent characteristics of the particular catalyst. If it is desired to produce cis 1,4-polyisoprene at 50% conversion having an I.V. of 7.0 dl./gm., 2.75 p.p.m. of active catalyst are needed. If the desired I.V. is 8.0 dl./gm., 2.3 p.p.m. of this catalyst are needed. In a similar manner other relationships of I.V. to catalyst requirements are established. In this specification the I.V.'s are determined in toluene at 25° C. It will be seen that FIG. 1 merely shows one method of establishing the catalyst concentration that is to be used and, since the catalyst concentration is held essentially constant for purposes of this invention, any other method for fixing the concentration may be used.

FIG. 2 graphically illustrates the mechanics of the termination-reinitiation using information developed above and illustrated in FIG. 1.

From FIG. 1, 2.75 p.p.m. of n-butyl lithium will give an I.V. of 7.0 at 50% conversion. If the polymerization is permitted to continue unabated, the path of the I.V. line will follow that indicated by the line *ca* in FIG. 2. According to this invention, the polymerization is terminated at, say, 50% conversion by adding a terminator of stoichiometric excess of the catalyst. The I.V. of the elastomer is then 7.0 as indicated at point *a'*. The vessel then contains 50% of the original monomer and the polymerization is reinitiated by adding catalyst in an amount essentially equivalent to the terminator. The path of the I.V. of the elastomer then follows the line *b*. At 100% conversion, the remaining monomer is converted to polymer of I.V. 7.0 and the profile of the I.V. history is shown by line *b*. Since the same amount of catalyst is used both for the initiation and reinitiation, an equal number of chains are initiated in both cases. The curvature in line *b* shows how the average molecular weight changes in relation to the amount of monomer available. Line *c* and its extension, *a*, are defined by the amount of catalyst used. Thus an I.V. of 6.0 is obtained first at a conversion of about 40.5% as indicated by point *d*. The lower I.V. means, in effect, that the catalyst concentration per unit of monomer polymerized is higher. Terminating the polymerization at 40.5% conversion is not too efficient so reinitiation should be undertaken in which the same amount of catalyst is used, i.e., 2.75 p.p.m. The I.V. profile of reinitiated polymerizations then follows the path of line *e* and at about 81% conversion the I.V. of 6.0 is again reached. Termination at this point will leave about 19% of the monomer unreacted and if a third reinitiation is undertaken, the I.V. profile is shown by *f*.

If the reaction is not terminated by the addition of a chain terminator, then the I.V. follows the path shown by dotted line g. Line f would not, in theory, intercept the I.V. 6.0 line again until 121.5% conversion. In practice, the total polymer after conversion of the remaining 19% unreacted monomer would have an I.V. of about 5.75.

From the above illustrations, it is shown that varying the amount of catalyst changes the I.V. locus. Thus, instead of an I.V. of 7.0, a product having an I.V. of 6.0 can be readily obtained in a high conversion. In a similar manner, a product of I.V. 7.0 is obtained at a different catalyst concentration in which case the paths of the I.V. locus would vary slightly. This is shown by referring again to FIG. 2 for another illustration.

When the catalyst concentration is such as to give an I.V. of 7.0 at 30% conversion, the path of the I.V. is shown by line h. With this catalyst and at this concentration, one cannot produce I.V. 7.0 cis 1,4-polyisoprene at 50% conversion. In order to produce elastomer having 7.0 I.V., the polymerization must be terminated at 30% conversion. Since it is uneconomical to recover the elastomer at this point, the polymerization is reinitiated with essentially the same amount of catalyst, and when the conversion reaches 60% of the initial monomer charge, the I.V. of the reinitiated polymerization will be about 7.0. This is shown by line i. Another termination and reinitiation will produce the path j which will reach an I.V. of 7.0 at 90% conversion and pass I.V. 7.0 if the polymerization is not terminated.

As previously indicated, the terminator is used in stoichiometric excess of the active catalyst. The amount of excess is not at all important or controlling as it is only important to add sufficient terminator to stop the polymerization. Reinitiation is begun by adding about an equivalent amount of the catalyst. This is best illustrated by an example. If the polymerization is begun with, say, 2.5 p.p.m. of catalyst, then any amount of equivalent terminator in excess of 2.5 p.p.m. will terminate the polymerization. If less terminator than that equivalent to 2.5 p.p.m. catalyst is added, the polymerization will continue by reason of the fact that the system contains excess active catalyst. It is also possible to add an equivalent amount of terminator, but in actual practice such a refined procedure is quite impractical. If terminator equivalent to 3.0 p.p.m. catalyst is added the polymerization stops, leaving terminator equivalent to 0.5 p.p.m. in the reactor. Reinitiation of the polymerization is accomplished by adding about 3.0 p.p.m. of catalyst. This amount will consume, or neutralize, the remaining terminator and leave about 2.5 p.p.m. of active catalyst, the same amount that was used initially. Larger excesses of terminator operate in the same way. Thus, if terminator equivalent to 100 p.p.m. catalyst is added, 2.5 equivalent p.p.m. of it is used in terminating the polymerization, and when 100 p.p.m. of active catalyst is added back to reinitiate, 97.5 equivalent p.p.m. of it is used to counteract the terminator thus leaving 2.5 p.p.m. of active catalyst. It will be readily apparent that no useful purpose is accomplished in adding large excesses of terminator when only slight excesses are adequate. It will also be apparent, from the above and from FIG. 2, that product uniformity may suffer if the concentration of active catalyst is not maintained essentially constant. Still further, it will be readily seen that, for the purpose of this invention, it is important that the polymerization be terminated when the elastomer reaches the desired I.V. at a particular conversion which may be determined by any suitable means for monitoring the polymerization. There are, of course, various ways for monitoring the conversion and the molecular weight during the polymerizations. A particularly suitable means for the former consists of determining the composition of the vapor in the reactor by ultra-violet absorption. This may also be done by withdrawing, periodically, samples of the vapor contained in the reactor for automatic determination with GLC instrumentation. A method of monitoring the molecular weight is by observing the viscosity of samples withdrawn from the reactor from time to time. The solution viscosity and solids content are simply correlated to the intrinsic viscosity. Yet another method is by the relationship of the intrinsic viscosity to the power requirements needed to rotate the agitator within the reactor. Any combination of these methods may be used; the first is particularly suitable since it is most accurate and very rapid.

Persons skilled in the art will readily appreciate that the above discussion contains certain aspects of theory. In the actual practice of the invention, it is not always possible to follow the theoretical aspects. Nevertheless, the essence of the above discussion, in practice, follows very closely the theoretical discussion outlined above, and it is not intended that this invention be limited by any theoretical considerations. That the invention not be limited by theory is particularly necessary since commercial operations do not always lend themselves to the refinements of operations used in laboratory apparatus.

The chain terminator may be any compound having an active hydrogen atom. There are, however, some chain terminators that are more preferred than others because they provide certain advantages which some other chain terminators may not provide. Organic compounds having active hydrogen atoms are preferred as they are fast acting; this is important as slow acting chain terminators more easily result in products having a wide distribution of molecular weight. Among the more preferred organic compounds there may be mentioned alcohols, aldehydes, ketones, and acids having from 1 to about 24 carbon atoms. Such compounds are generally convenient to handle and economical to use. Organic amines and other compounds having active hydrogen may be used, but they are more costly. Water is also suitable but it is tricky to use in the small amounts usually required. The same is the case of mineral acids. Since the mechanics of the termination and reinitiation are actually quite simple, no useful purpose is accomplished by using more costly terminators or terminators that are tricky to handle.

The more preferred terminators are normally liquid and contain a total of 1 to 12 carbon atoms. Normally solid organic compounds having up to 24 carbon atoms are also suitable if they are first dissolved in an inert hydrocarbon solvent and then added to the reactor while in solution. In such cases the solvent preferably is the same as that employed as the diluent for the polymerization. Among the more preferred members are alcohols as methanol, isopropanol, butanol, isobutanol, amyl alcohol, hexanol, dodecyl alcohol, crotyl alcohol, glycerol and the like. Among the aldehydes and ketones there may be mentioned propionaldehyde, crotonaldehyde, cinnamic aldehyde, acetone, methylethyl ketone, methyl butyl ketone and the like. The more preferred organic acids are represented by acetic acid, propionic acid, butyric acid, valeric acid and others that are readily soluble in hydrocarbon solvents. Polycarboxylic acids, whether aliphatic or aromatic, are also suitable. Thus, a solution of maleic acid is quite suitable although less preferred as are such compounds as isophthalic acid.

The invention is described in greater detail in the following additional examples.

EXAMPLES 1–7

For these examples, polymerizations are conducted in a 5-gallon pilot plant reactor. The chain terminator used is a 0.3% solution of methanol in n-heptane. The object in this run is to produce polyisoprene having a high cis 1,4-content and I.V. within the range of 6–9 using the methods of polymerization with termination and reinitiation described above with the catalyst being n-butyl lithium. It will be seen from Table I that in all cases the desired objective is obtained.

Table I

| Ex. No. | At Termination | | | | | Cat. Equiv. to MeOH | Cat. uesd to Reinitiate, p.p.m. | Final Result | | | Control (a) I.V. |
|---|---|---|---|---|---|---|---|---|---|---|---|
| | Percent Conv. | I.V. | Percent Cis 1,4- | Active Cat., p.p.m. | Amt. MeOH, p.p.m. | | | I.V. | Total Conv. Percent | Percent Cis 1,4- | |
| 1 | 56 | 8.7 | 92.9 | 2.2 | | | 3.1 | 8.4 | 100 | 92.4 | 12.9 |
| 2 | 62 | 7.5 | 92.7 | 3.0 | 1.8 | 3.6 | 3.5 | 7.6 | 80 | 91.8 | 10.4 |
| 3 | 61 | 7.6 | 92.5 | 2.9 | 1.8 | 3.6 | 2.5 | 7.1 | 95.5 | 92.1 | 10.7 |
| 4 | 51 | 6.2 | 92.7 | 3.3 | 1 1 | (b)2.2 | 3.5 | 7.6 | 90.0 | 92.3 | 9.9 |
| 5 | 63 | 6.3 | 92.1 | 3.9 | 1.4 | (b) 2.8 | 3.6 | 6.6 | 91.5 | 91.5 | 8.7 |
| 6 | 69 | 7.4 | 92.5 | 3.4 | 1.1 | (b) 2.2 | 3.6 | 7.1 | 100 | 92.2 | 9.5 |
| 7 | 64 | 8.6 | 92.5 | 2.6 | 1.1 | (b) 2.2 | 3.1 | 7.8 | 100 | 92.1 | 11.6 |

(a) The control I.V.'s are obtained by extrapolation of the data for each example.
(b) Although less than stoichiometric equivalents were used, effective control of I.V. was obtained although the effectiveness was not at its maximum.

From these examples, it appears that highly suitable results are obtained with a single cycle of termination and reinitiation but, as indicated above, more than one cycle can be used and this is shown in Example 8.

EXAMPLE 8

The procedures of Examples 1–7 are repeated using 1.1 p.p.m. of active catalyst and a reactor equipped with automatic GLC. When the monitor indicates that the conversion is about 25%, 2.1 p.p.m. of methanol is added to terminate the polymerization. To the reactor is then added 3.9 p.p.m. of catalyst and the polymerization is permitted to continue until the monitor shows a conversion of about 50% at which point an additional 2.1 p.p.m. of methanol is added. A third initiation with an additional 4.4 p.p.m. of catalyst is undertaken, and when the monitor indicates a total of 75% conversion, the reaction is terminated by discharging the contents of the reactor through the atmosphere. A final analysis shows a cis 1,4-content of 93.5%, an I.V. of 5.4, and a conversion of 73%. Thus, it will be seen that a high conversion of monomer is obtained again although the I.V. of the product is relatively low. It is estimated that without the termination-reinitiation steps the I.V. would have been nearly 15 dl./g.

The procedure of Example 8 is repeated except that the polymerization is permitted to proceed to about 100% conversion. The resulting product has about the same cis 1,4-content but the average I.V. is 5.7. Here again high conversion of isoprene is obtained to yield a high content of cis 1,4-polyisoprene having a very suitable intrinsic viscosity.

EXAMPLE 9

The procedures used for Examples 1–7 are repeated except that for the termination step tert-butyl catechol (TBC) is used. For this polymerization, 4.7 p.p.m. of butyl lithium is used as the catalyst and the TBC is used to terminate in an amount of 10 p.p.m. when the conversion is indicated to be 40%. Analysis indicates that the conversion, by the time the TBC completely terminated, was 42% and the I.V. was 4.2. Reinitiation is achieved with 3.5 p.p.m. of catalyst and the polymerization is permitted to proceed to about 100% conversion. The final product has an I.V. of 4.4 and a cis 1,4-content of 91.4%. The lower structure is due to the higher catalyst concentration used in this run.

As previously indicated, the operability of this invention requires any lithium based catalyst and any of a variety of chain terminators. A variety of conditions are given in Table II, which show the various embodiments of this invention.

EXAMPLES 10–21

For these experiments, a slight excess of the stoichiometric equivalent of the terminator is used and reinitiation is with about an equivalent amount of terminator used.

Table II

| Ex. | Catalyst | Amt., p.p.m.[a] | Terminator | At Termination | | Final Product | | |
|---|---|---|---|---|---|---|---|---|
| | | | | Percent Conv. | I.V. | Total Conv., percent | Final I.V. | Cis 1,4-, percent |
| 10 | sec-butyl Li | 2.8 | isopropanol | 48 | 6.6 | 92 | 6.4 | 92.6 |
| 11 | do | 2.5 | acetone | 52 | 7.5 | 98 | 7.2 | 92.8 |
| 12 | do | 2.9 | methyl ethyl ketone | 51 | 6.8 | 98 | 6.7 | 92.5 |
| 13 | tert-butyl Li | 2.9 | propionic acid | 46 | 6.2 | 100 | 6.7 | 92.5 |
| 14 | do | 3.1 | butyric acid | 48 | 6.2 | 96 | 6.2 | 92.4 |
| 15 | do | 3.1 | benzoic acid | 51 | 6.4 | 93 | 6.0 | |
| 16 | Li+n-butyl Li [c] | 3.2 | maleic acid [c] | 50 | 6.2 | 95 | 6.0 | |
| 17 | do | 3.4 | propionaldehyde | 50 | 6.0 | 93 | 5.9 | |
| 18 | LiAlH₄+n-butyl Li [b] | 3.8 | crotonaldehyde | 62 | 6.4 | 94 | 5.6 | |
| 19 | TiCl₃+n-butyl Li | 3.0 | cinnamic aldehyde | 52 | 6.7 | 100 | 6.5 | |
| 20 | do | 2.4 | stearyl alcohol | 47 | 7.2 | 88 | 6.9 | |
| 21 | Li-Mg alloy [b] | 3.9 | do | 51 | 5.5 | 82 | 4.9 | |

[a] Butyl lithium equivalent.
[b] As an equimolar mixture.
[c] As a 2% solution in n-heptane.

The use of lithium based catalysts is particularly suitable for the polymerization of isoprene since the polyisoprene contains a high proportion of the cis 1,4-addition product. When lithium based catalysts are used to polymerize other conjugated dienes, the cis-content is usually substantially less. Nevertheless, the processes of this invention may be used to produce products that are uniform in I.V., as in the case of isoprene polymerizations.

From the foregoing description of the invention, the various modifications of the processes of the invention will be readily apparent to persons skilled in the art.

We claim as our invention:

1. In the process for the polymerization of isoprene with a lithium based catalyst, at a temperature ranging from about room temperature to 80° C., the polymerization being conducted in the presence of an inert hydrocarbon solvent, the improvement comprising adding to the reactor a polymerization chain terminator when the isoprene conversion is between 20 and 80 weight percent, the chain terminator having an active hydrogen atom and the amount added being in about stoichiometric excess to the active lithium based catalyst present during the polymerization, thereafter adding an additional amount of catalyst, which amount is about stoichiometrically equivalent to the terminator.

2. The process of claim 1 wherein the chain terminator is added when the monomer conversion is between 30 and 60%, by weight.

3. The process of claim 1 wherein the catalyst is n-butyl lithium.

4. The process of claim 1 wherein the catalyst is n-amyl lithium.

5. The process of claim 1 wherein the catalyst is sec-butyl lithium.

6. The process of claim 1 wherein the catalyst is tert-butyl lithium.

7. The process of claim 1 wherein the chain terminator is an alcohol.

8. The process of claim 1 wherein the chain terminator is methanol.

9. The process of claim 1 wherein the chain terminator is propanol.

10. The process of claim 1 wherein the chain terminator is an aldehyde.

11. The process of claim 1 wherein the chain terminator is a ketone.

12. The process of claim 1 wherein the chain terminator is acetone.

13. The process of claim 1 wherein the chain terminator is methyl ethyl ketone.

14. The process of claim 1 wherein the chain terminator is an organic acid.

15. The process of claim 1 wherein the chain terminator is propionic acid.

16. The process of claim 1 wherein the chain terminator is benzoic acid.

References Cited in the file of this patent

FOREIGN PATENTS 580,388    Belgium _____ January 1960